(12) United States Patent
Tsypliaev et al.

(10) Patent No.: US 8,261,035 B1
(45) Date of Patent: *Sep. 4, 2012

(54) SYSTEM AND METHOD FOR ONLINE DATA MIGRATION

(75) Inventors: Maxim V. Tsypliaev, Moscow (RU); Maxim V. Lyadvinsky, Moscow (RU); Alexander G. Tormasov, Moscow (RU); Serguei M. Beloussov, Singapore (SG)

(73) Assignee: Acronis International GmbHH, Schaffhausen (CH)

( * ) Notice: Subject to any disclaimer, the term of this patent is extended or adjusted under 35 U.S.C. 154(b) by 266 days.

This patent is subject to a terminal disclaimer.

(21) Appl. No.: 12/848,134

(22) Filed: Jul. 31, 2010

Related U.S. Application Data

(63) Continuation of application No. 11/832,132, filed on Aug. 1, 2007, now Pat. No. 7,779,221, which is a continuation of application No. 11/084,756, filed on Mar. 21, 2005, now Pat. No. 7,281,104.

(51) Int. Cl.
*G06F 12/00* (2006.01)
*G06F 13/00* (2006.01)

(52) U.S. Cl. .................. 711/165; 711/100; 711/154

(58) Field of Classification Search .................. 711/100, 711/154, 165; 713/2; 717/162, 173
See application file for complete search history.

(56) References Cited

U.S. PATENT DOCUMENTS

| 5,848,433 | A | 12/1998 | Tran et al. |
|---|---|---|---|
| 6,185,666 | B1 | 2/2001 | Murray et al. |
| 6,983,352 | B2 | 1/2006 | Keohane et al. |
| 7,281,104 | B1 * | 10/2007 | Tsypliaev et al. ............. 711/165 |
| 7,353,355 | B1 * | 4/2008 | Tormasov et al. ............. 711/165 |
| 7,721,138 | B1 * | 5/2010 | Lyadvinsky et al. .......... 714/4.1 |
| 2007/0192558 | A1 | 8/2007 | Honda et al. |

* cited by examiner

*Primary Examiner* — Tuan V. Thai
(74) *Attorney, Agent, or Firm* — Bardmesser Law Group

(57) ABSTRACT

A method and system for changing storage drive contents, including installing a redirection driver in a computer system, wherein the redirection driver redirects access requests directed to a main storage of the computer system to one of the main storage and a temporary storage; copying files from the main storage to the temporary storage; restoring files from a source storage into the main storage by overwriting corresponding files in the main storage; and redirecting, to the temporary storage, requests for access directed to files of the main storage that have been copied to the temporary storage.

16 Claims, 8 Drawing Sheets

SYSTEM AND METHOD FOR ONLINE DATA MIGRATION

CROSS REFERENCE TO RELATED APPLICATIONS

This application is a continuation of U.S. patent application Ser. No. 11/832,132, filed Aug. 1, 2007, entitled SYSTEM AND METHOD FOR ONLINE DATA MIGRATION, which is a continuation of U.S. patent application Ser. No. 11/084,756, filed Mar. 21, 2005, entitled SYSTEM AND METHOD FOR ONLINE DATA MIGRATION, which is incorporated herein by reference in its entirety.

BACKGROUND OF THE INVENTION

1. Field of the Invention

The present invention is related to substitution or migration of drive content within computer system, and more particularly, to a restoration of a server from an image stored on a network without perceptible downtime. The present invention is also related to replicating disk content between servers of a network of servers and also to swapping of disk drive storage between different computers.

2. Background Art

With the popularity and success of the Internet, server technologies are of great commercial importance today. An individual server application typically executes on a single physical host computer, servicing client requests.

In conventional systems, the data of the server is typically backed up on some storage device in the form of backup files. If the server crashes or fails, or the software becomes corrupted, it may become necessary to restore the state of the server to some previously backed-up state. If, for some reason the server physically crashes, the content of the backup should be restored on another operating server. Also, changing the content of the server may be needed when the server should be started in another operating mode, e.g., when the current operation mode of server has a lower priority then the mode defined by the data being substituted.

In many data center applications, it is often necessary to swap contents of disk drives. For example, this operation may be required when one server is being shut down, and another one is brought online. It may also be necessary to swap disk drives when one server is under-utilized, or another server is overloaded. It may also be necessary to swap the contents of disk drives in the course of data recovery procedures, or to upgrade the operating system.

Usually the conventional process consists of three steps: (1) the machine is physically shut down; (2) the data is copied from the backup storage to the storage, e.g., disk drive, used by the server; and (3) the server is restarted.

Such a procedure requires a lot of downtime, since during the substitution the server is inoperable. Also, transmission channels become overloaded when the server has to be restored with high priority. This is inefficient, disrupts normal operations, and is usually unnecessary, given that the vast majority of the data on the local drive is frequently unaltered, notwithstanding the fact that the entire local drive is backed up.

Similarly, the reverse of the process is also true—recovery using backed up data frequently takes a long time, since conventional systems require copying of the entire archived set of data (often referred to as "image"), which consumes a great deal of time and often considerable network resources. During the restart time, the server does not perform any useful functions. Also, the process of restoring all the files of the server is time consuming. In corporate networks, a typical server can have 100 Gigabytes (or, frequently, much more than that) of data. With a transfer rate up to 100 Megabytes per second over a network, it would take approximately 1,000 seconds to transfer all the data from the backup storage to the server's local storage. This assumes that the entire network bandwidth is available for this process. Frequently, this is not the case, since only a fraction of the bandwidth may actually be available at any given time for restoring the files from backup. In practice, such transfers of data from backup to the server's local storage can take many hours.

Furthermore, it is preferred to perform the data migration with minimum overloading of network resources, particularly large scale data transfers over the local network, since such transfers consume network bandwidth, slow down useful applications and affect many users of the local network.

Also, even 1,000 seconds of downtime is an extremely long time, particularly for many mission-critical applications. For example, if the server in question is a web server that handles customer requests or sales, a period of 16-20 minutes of downtime can result in substantial lost sales. Furthermore, it is generally believed that for many e-commerce applications, the consumer attention span is relatively short, and a customer that does not receive a rapid response from a web server will simply go to a competitor's website.

Therefore, there is a need in the art for an efficient and fast data migration from backup, including restoration with a different version of an operating system.

SUMMARY OF THE INVENTION

The present invention relates to a system and method for online data migration that substantially obviates one or more of the disadvantages of the related art.

More particularly, in an exemplary embodiment of the present invention, a method of changing storage drive contents includes changing, in an operating system, a main storage driver to create a virtual storage driver, wherein the virtual storage driver redirects access requests to a main storage either to one of the main storage and a temporary storage; copying, as a background process, blocks from the main storage to the temporary storage; restoring, to the temporary storage as a background process, blocks from a source storage into blocks of the main storage; and redirecting, to the temporary storage, operating system's requests for access to blocks of the main storage that have been copied to the temporary storage. The method can also include hiding the temporary storage from the operating system. The main storage and the temporary storage can share partitions of the same physical storage drive. Free blocks of the physical storage drive can be used as blocks of the temporary storage. Blocks can be assigned to the temporary storage in succession.

The method can also include finishing the substituting step and copying blocks of the temporary storage back to corresponding blocks of the main storage if there are no free blocks available in or for the temporary storage. The method can also include using blocks of different drives as blocks of the temporary storage if the storage drive contains an insufficient number of free blocks. The virtual storage can represent at least a partition of the disk drive, and blocks of the temporary storage can be recognized by the operating system as blocks of a read-only structure. The method can also include booting up another operating system after finishing substituting storage drive content. The method can also include storing, in the source storage, an earlier state of the main storage.

The method can also include dividing a physical storage drive into the main storage, the temporary storage and a residual storage area, such that blocks of the residual storage area are available for access requests generated by the operating system. The temporary storage can be implemented as a RAM, as a DVD-RAM, or as a hard disk drive. The source storage can include blocks of another operating system area.

In another aspect, a system for changing storage drive contents includes a computer system having a main storage, a temporary storage, and a source storage. An operating system runs on the computer system and has a virtual storage driver, which redirects access requests to a main storage to one of the main storage and a temporary storage. A first background process runs on the computer system that copies blocks from the main storage to the temporary storage. A second background process runs on the computer system that restores to the temporary storage blocks from a source storage into blocks of the main storage that have already been copied. The operating system's requests for access to blocks of the main storage that have been copied to the temporary storage are redirected to the temporary storage.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
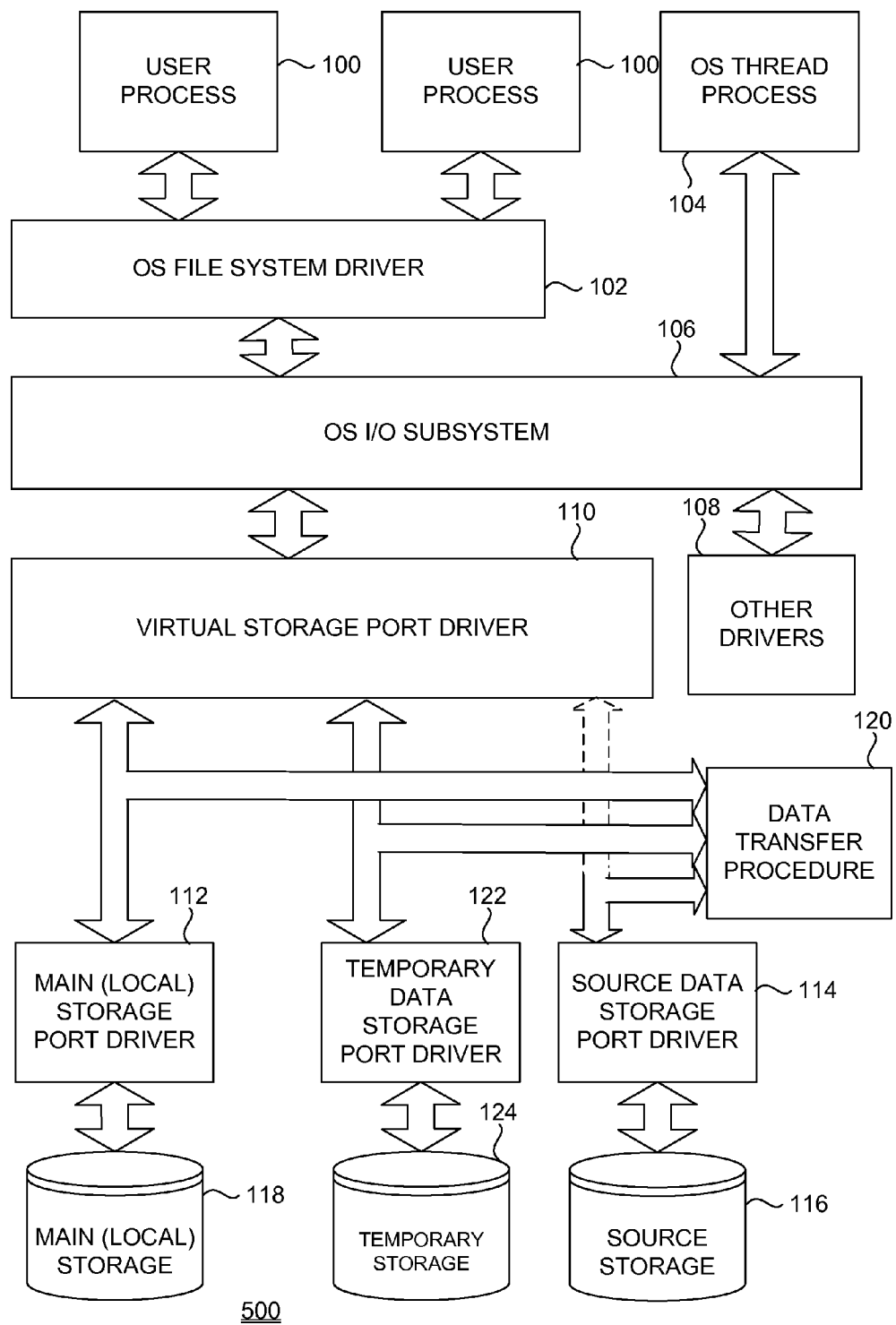
FIG. 1 illustrates an example of a data processing model during the incremental backup.

Reference will now be made in detail to the preferred embodiments of the present invention, examples of which are illustrated in the accompanying drawings.

The present invention is related to a utility for server restoration, substitution or swapping that works on a data block level. The use of data block-based backup, rather than file-based backup permits restarting the server from the backup data, usually referred to as an "image" or a "source drive." Alternatively, the main drive of another server may be used as an image, when substitution is required.

In one embodiment of the present invention, virtual storage is mounted for providing restoration or substitution of HDD (hard disk drive) contents without significant downtime. Virtual storage is a combination of two parts: main storage and temporary storage. The main storage of the server is substituted by archived or stored data from some auxiliary storage ("source storage"). Temporary storage reflects contents of blocks of the main storage that are intended to be substituted, as well as and some or all changes initiated in the main storage due to the execution of user applications.

The backed up or other substituting data, corresponding to the hard disk drive as it existed at some predefined point in time, are stored in the source drive. Such a drive may not only be a backup of any drive, but may be another drive itself, e.g., a drive of another server, that was in hibernation before the substitution process.

The present invention, in one embodiment, also provides for redirecting access requests to the temporary storage, when the access request is originally directed to the main storage.

In other words, a virtual storage (e.g., a virtual disk drive) is created that combines in general two separate devices or storage areas that represent a device. One of these devices may be used by the operational system in read-only mode for some blocks, and the other device is used for both reading and writing, as the data is being copied or modified. Also, uncopied blocks of the main storage may be accessed by the operating system both for reading and writing. The method of handling virtual storage described herein ensures correct functioning of all user applications that need to use or modify data initially presented in the main storage.

Optionally, in the virtual storage, any WRITE requests can be addressed to the temporary storage, instead of to the main storage. After all the required data from the source storage is transferred to the main storage, the server may be restarted at any point in time in a new mode, defined by the restored or changed main drive. Data from the temporary storage can be backed up, or archived, to create a backup of the drive that has been substituted.

On the other hand, only the uncopied blocks of the source drive should generally be treated as "READ only" blocks during substitution, which provides an option to use the source drive in another server. All changes, or edits, to the files caused by a user application can be treated using source storage in this manner.

Different embodiments of the invention may be used independent of subsequent handling of main storage content after completion of the substitution.

In one embodiment, when the content of the disk drive is discarded after substitution, the main storage area is defined to coincide with the source storage only. In this case, the substitution procedure is considered completed after all the blocks of the source storage are restored. Then, the system may be restarted even if the temporary storage becomes inaccessible or completely discarded. Also, in this embodiment, only those blocks that correspond to the blocks of the source storage that must be restored should be copied from the main storage to the temporary storage.

In another embodiment, the main storage area is defined to provide subsequent restoration of the main storage area. In this case, complete copying of blocks from the main storage to the temporary storage is implemented even after full restoration of the source drive.

In another embodiment, the resulting temporary storage may be used as a backup or as source storage for another drive. Such an implementation makes possible swapping of disk drives' content.

The present invention also makes it possible to substitute dynamically changed disk content. In this case all the changes in the source drive content should be reflected in the blocks of the main storage that have been already restored.

FIG. 1 is an illustration showing a computing system 500 having a disk replacement procedure in accordance with an embodiment of the present invention.

The computing system 500 includes user processes 100 executing in an OS environment having a file system driver 102. Also, one or more OS thread processes 104 may be executed in parallel with user processes. An OS I/O subsystem 106 is in communication with the file system driver 102. The I/O subsystem 106 uses a class driver to manage and deliver I/O requests to device drivers 108 and 110, that provide communication to corresponding devices: I/O ports (not shown), local area network controllers (not shown), source data storage 116, local (main) data storage 118 (such as flash or hard disk drives), temporary data storage 124 if such storage is released as a separate drive, etc.

The source data storage 116 may be implemented as an image or backup file, or as data stored in some other (e.g. archived) format that allows extraction of blocks that are subject to the substitution.

Requests to main storage 118 are managed by means of dedicated driver (virtual storage driver) 110 that addresses data, corresponding to requests via corresponding storage ports by use of storage port drivers 112, 114 and 122 selected by the result of bitmap checking.

Temporary storage 124 is used for storing data transferred from the main storage 118, and, in one of the embodiment, for storage of other data, generated by user or OS thread processes initially directed to modification of blocks of the main storage 118. The temporary storage 124 can be implemented as, for example, a RAM, a rewritable optical drive, like DVD-RAM, or a hard disk drive. Also, the temporary storage 124 can be implemented as a set of elementary storage areas, physically located on the drive that already contains the main storage 118 (as a main storage area) or on the different drive. Main storage 118 and temporary storage 124 are hidden from the I/O subsystem 106 as different physical drives or physical areas, and their content is accessed by the I/O subsystem 106 as having an integral (unified) address space (including handling any issues with access requests for non-existent data or files).

After completion of the data transfer procedure and removal of the virtual storage driver from the OS, the I/O subsystem 106 manages requests to main storage 118, and, if needed, to the source data storage 116 and to the temporary storage 124 directly by means of source storage port driver 114, temporary storage port driver 122 and local storage port driver 112. Also, the server can be rebooted, if required.

Though data transfer procedure 120 is shown as an independent module, it runs in connection with the virtual storage port driver 110. For instance, bitmaps and redirection identifiers can be used by both virtual storage driver 110 and data transfer procedure 120, to provide access to the storage via virtual storage driver for the user and the OS threads processes.

The virtual storage port driver 110 is used to intercept access requests to the standard drivers 112, 114 normally used by the operating system, as well as for organizing the virtual storage (their components are shown as single structures, although in actuality they can actually be multiple storage elements). In another embodiment, two or more storages (or all the storages—main storage 118, temporary storage 124, and source storage 108) can be a part of a single physical drive, e.g., a hard disk drive or a partition of such a drive. Once the process is complete, the driver 110 may be removed from the system. As a result, the main storage 118 and the source storage 116 (e.g., network storage), after removal of the driver 110, are recognized by the operating system as distinct storage structures, e.g. storage drives, files, file structures and so on. Therefore, access requests to these devices are also processed based on standard procedures, e.g. utilities of the operating system. After completion of migration procedures, the main storage 118 can be used instead of the virtual storage.

Note that most commonly, the main storage 118 is physically local to the computing system 500 (see FIG. 5), although, with modern networking technology, this need not be the case. Also, temporary storage 124 and source storage 116 can be either physically local, physically remote, or distributed (such as in the form of a storage area network).

In another embodiment, the main storage 118 and temporary storage 124 are areas of the same hard disk drive, or areas of the same disk drive partition. Furthermore, particular blocks of the temporary storage 124 may be defined or assigned dynamically. Such an implementation may be used when the functioning of the server under substitution has a higher priority than a completion of the substitution. In this case, drive space is preferably assigned for user and OS processes so that the temporary storage 124 gets additional blocks only if the physical drive contains enough free space that may be requested by user applications during execution. Such a disk space may be defined as an absolute value or as a fixed portion of the disk capacity.

In another embodiment, the temporary storage 124 may be formed as a combination of blocks of the primary local drive and blocks of an external drive. Also, the temporary storage 124 can be implemented inside a separate drive or as a separate drive.

Also, source storage 116 may be implemented as a separate or external drive or a part of the external drive or may share a physical drive with the main storage 118 and/or the temporary storage 124. For example, areas that store backup files may be used as the source storage. In another embodiment, the main storage 118, the source storage 116 and the temporary storage 124 can share the same partition of the physical storage drive, e.g. hard disk drive. In this case, the source storage 116 may be represented by a backup image, and free blocks of the partition of the hard disk drive may be used for the temporary storage.

Figure 2:
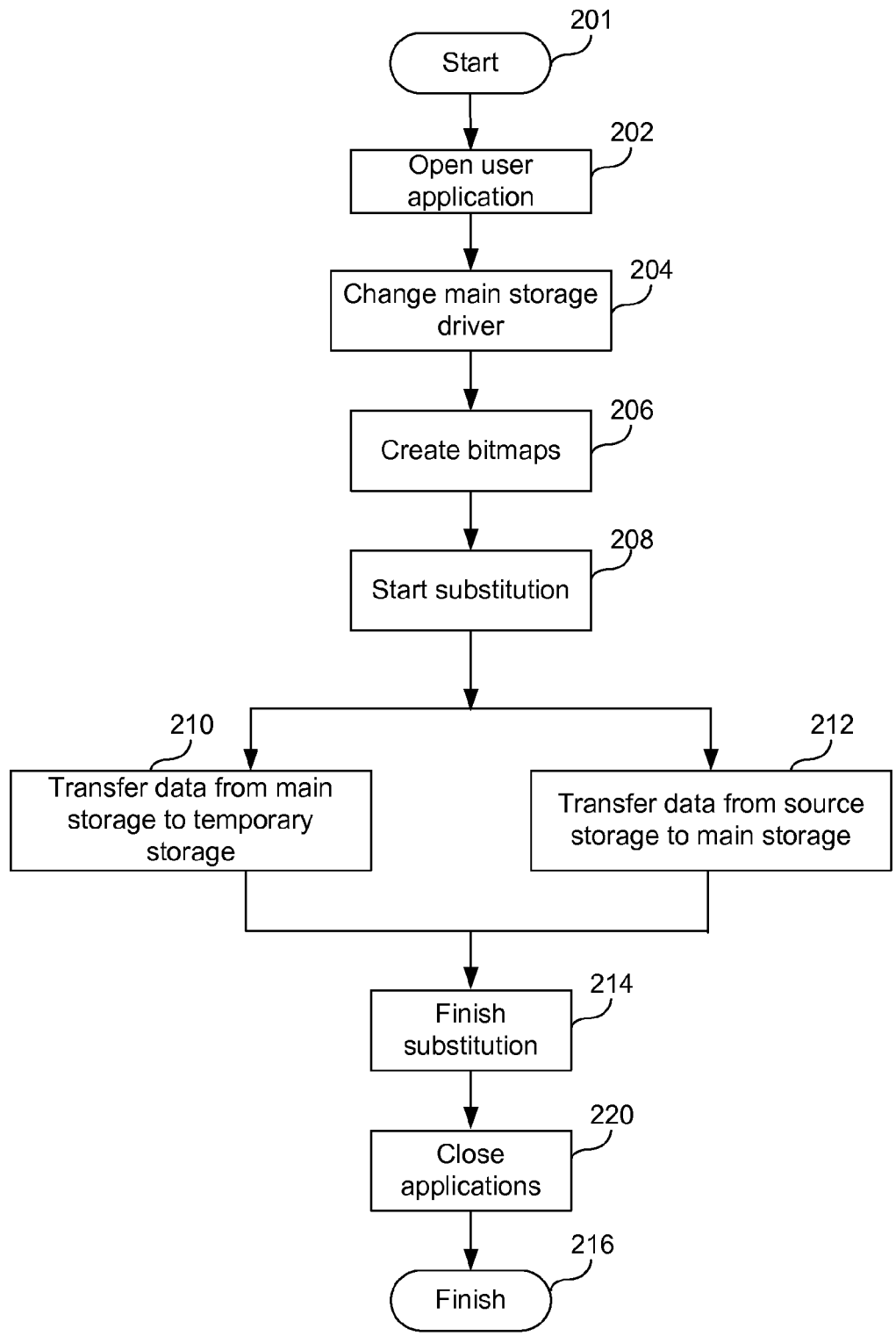
FIG. 2 illustrates the basic process of restoring a disk drive, such as a main storage drive, according to one embodiment of the present invention.

FIG. 2 illustrates the basic process of effecting a disk replacement or data substitution according to one embodiment of the present invention. As shown in FIG. 2, the process starts in step 201 (for example, the server or computing system 500 is started). User applications (e.g., user process 100) are then launched in step 202 (note that without user applications 100 running, there is essentially no reason to implement the process, since the server downtime does not cause any inconvenience.)

In step 204, the main storage driver has been changed, so as to implement a redirection procedure. The redirection procedure can be implemented either by fully substituting the main storage driver or by updating the main storage driver with an added redirection procedure, or by a filter that redirects I/O requests either to the main storage 118 or to the temporary storage 124. The main storage 118, such as the hard disk drive normally used by the user applications 100, stays visible to the operating system as a consistent storage area, but from this point forward, the main storage 118 is represented by a virtual storage. Such a virtual storage can be formed using one or more local disks or partitions, using network storage, such as a storage area network, using remote or external storage, etc. However, the virtual storage will be treated as if it has a common address space for all the blocks (combining the temporary storage 124 and the main storage 118, and, optionally, source data storage 116).

At this point, all the READ and WRITE requests to the main storage 118 will be handled using the dedicated driver 110 for virtual storage.

The preferred embodiment of the invention utilizes known bitmap technique for identification of blocks that have to be treated during copying and/or substituting procedures.

In step 206, a first bitmap is created. The first bitmap, reflects, among other things, the blocks of the temporary storage 124 that should be handled or recognized by the OS during the procedure as blocks of the main storage 118. Also, the second bitmap is created to identify those blocks, or files, or storage sub-units of the main storage 118 that are subject to the migration (transfer) from the source storage 116. The second bitmap may initially reflect "used" bocks of the main storage 118 as marked and free blocks as unmarked, since there is no purpose in copying those blocks in the temporary storage 118 area. In this case, some blocks from the source storage 116 are restored to those free blocks. Used blocks also can be blocks of the OS area. Also, blocks of deleted files, or all the blocks of the disk, may be marked.

In another embodiment, the first bitmap initially contains no block identifiers, and such identifiers are added to the first bitmap (marked in the bitmap) during the process of transferring the blocks from the main storage 118 to the temporary storage 124. In other words, all the blocks of the main storage 118 that are not reflected in the first bitmap remain unmarked. After moving or copying a block from the main storage 118 to the temporary storage 124, a record that identifies the block is added to the first bitmap and blocks remains marked. Such a record can identify not only the block of the main storage 118, e.g., the block's address, but also a corresponding block of the temporary storage 124. In the latter case blocks may be assigned to the temporary storage 124 dynamically, as needed. Some mechanism should be used to identify correspondence between a block of the temporary storage 124 and a block of the main storage 118. Links or a lookup table may be used to provide such a correspondence.

Note that working with the virtual drive requires appropriate drivers, for example, by replacing standard drivers with custom drivers. The copying of the data should preferably done as a background process, for example, by using a hard disk drive or a random access memory as a temporary storage, which substantially increases the speed of user application execution during the copying process.

In another embodiment, only those blocks that should be overwritten during the process of data substitution can be marked in the first bitmap. In this manner only the substituted area of an HDD is considered as a main (local) storage 118, while other blocks of HDD may be treated as direct access blocks. Also free blocks of HDD that are not reflected in the first bitmap may be used for migrating data from the main storage 118 to the temporary storage 124.

Once the content of the main storage 118 may be discarded after data migration has been completed, a common bitmap may be created for only those blocks that should be substituted. In such a common bitmap, two bits or flags correspond to one block. The first bit reflects that the block is free, e.g., data of that block has been transferred to the temporary storage 118 or have been overwritten. The second bit reflects that the block is substituted. Even though such a bitmap is a single bitmap, it can be viewed as two bitmaps merged together.

Also, the links mentioned above may be used as a part of the bitmap. In this manner, in one embodiment of the invention, the bitmap may contain not only single bits that reflect whether a block has been copied but also additional information like a path to the destination block or other additional marks.

Also, the bitmap's access procedures can utilize locking means used during attempts to parallel access the storages by other processes.

In step 208 the substitution process is started, including preparing conditions for starting and running the process 210 of transferring data from the main storage 118 to the temporary storage 118 and the process 212 of transferring data from the source storage to the main storage 118.

Figure 3:
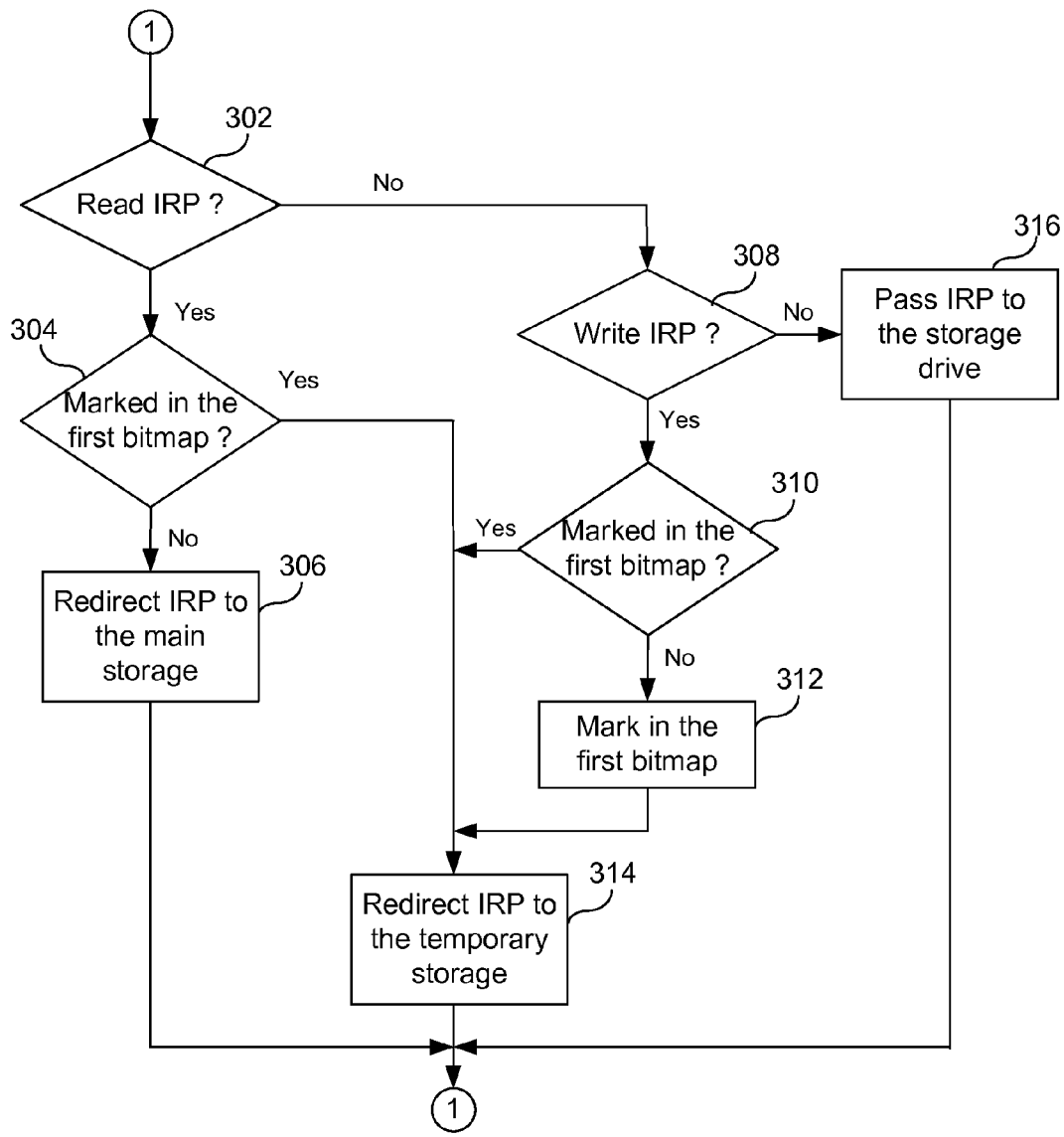
FIG. 3 illustrates the process of handling IRPs in the present invention.
Figure 4:
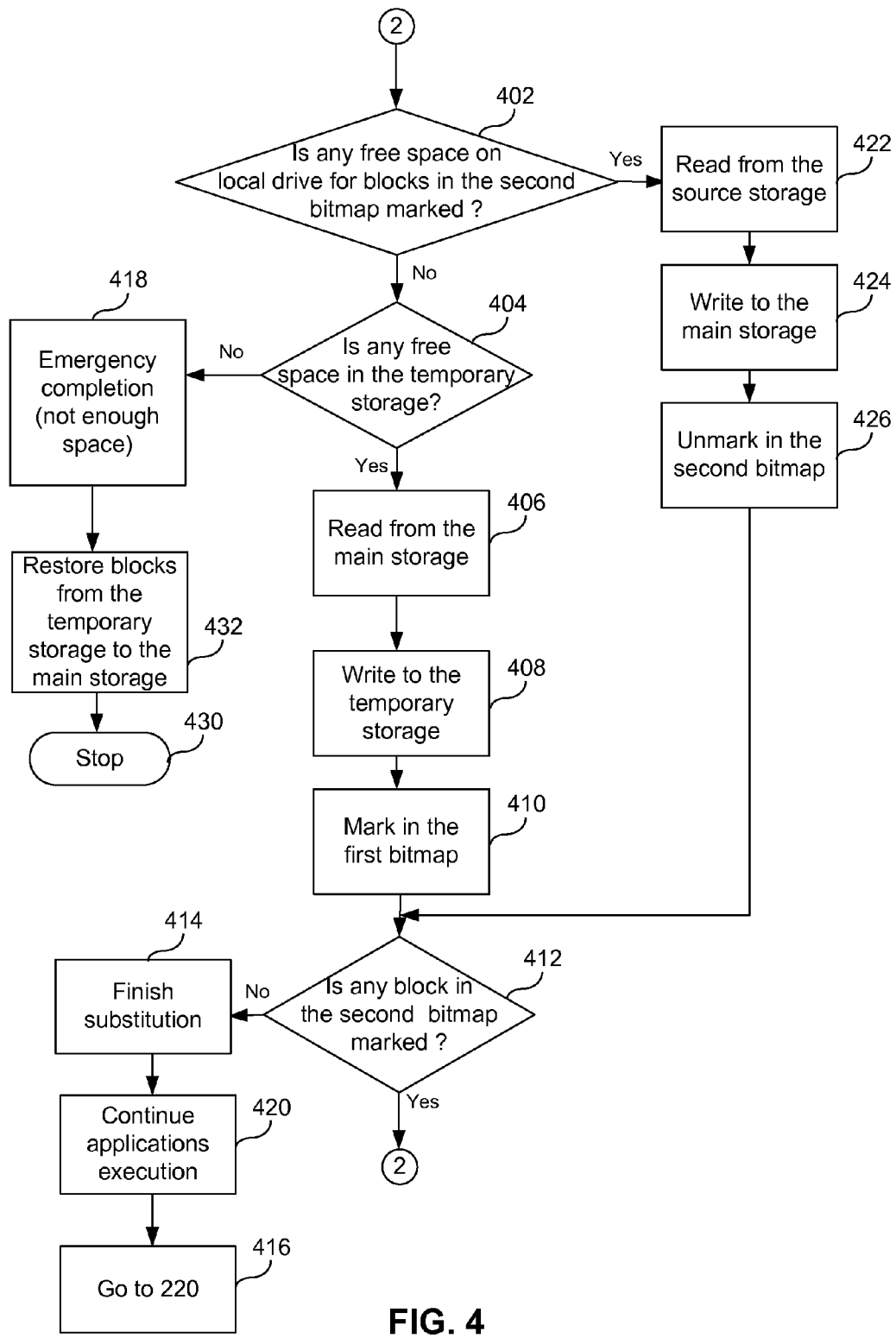
FIG. 4 illustrates the process of transferring data from the source to the main (local) storage.
Figure 6:
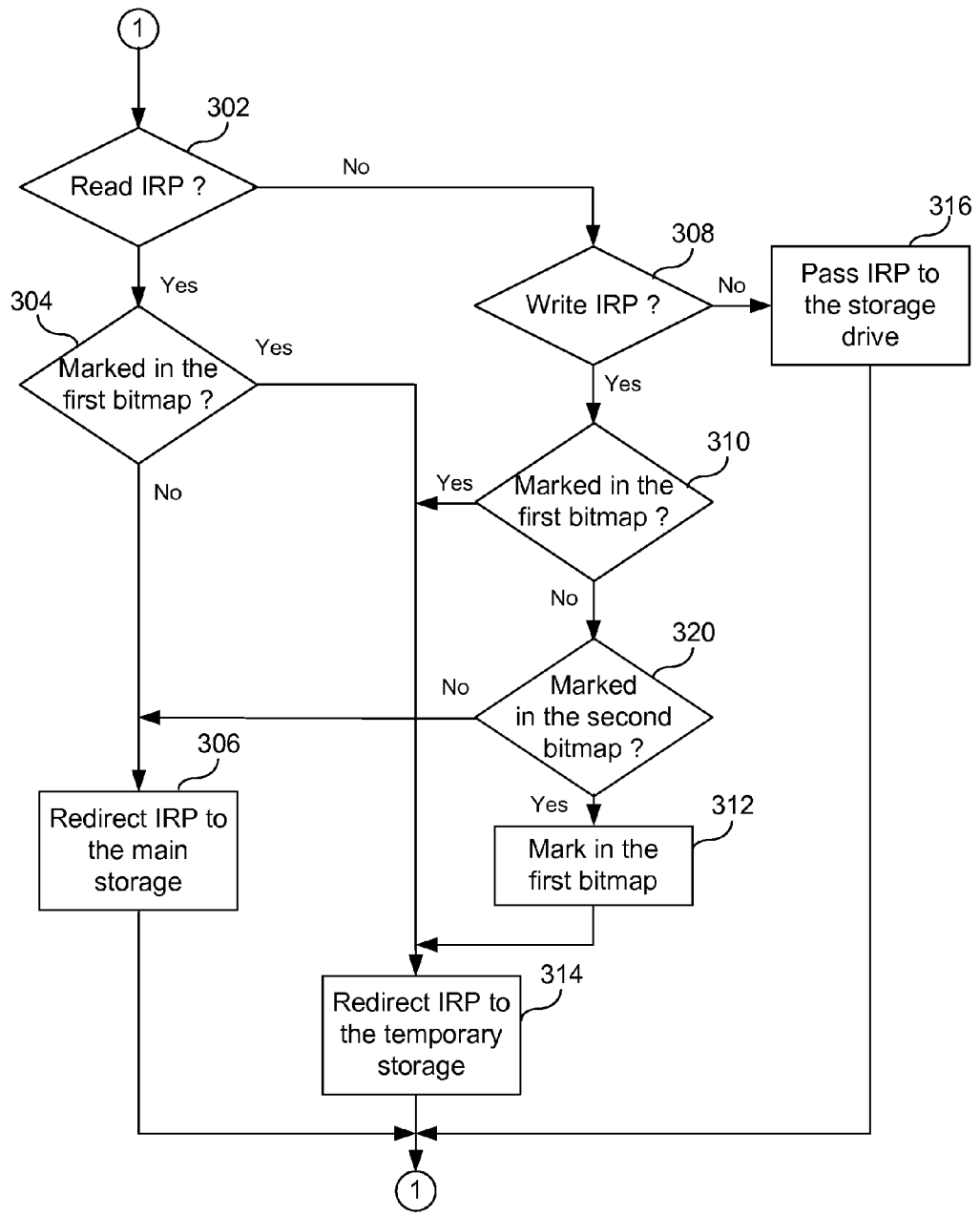
FIG. 6 illustrates an alternative embodiment of IRP handling.

Processes 210 and 212 that transfer blocks between storages are shown in FIGS. 3, 4 and 6. In step 210, data is transferred from the main (local) storage 118 to the temporary storage 118. In step 212, data is transferred from the source storage 116 to the main storage 118. Although steps 210 and 212 are shown in parallel, these processes may be synchronous to each other or may run in parallel. Nevertheless transferring data from the source storage 116 to main storage 118 may be implemented when free or "cleared" blocks exist on the main storage 118. Step 212 can also be halted or suspended until step 210 performs its required operations.

In step 214, the substitution is finished. In step 220, the user applications 100 are terminated, and the transfer process can completely finish in step 216, since typically there is no point in treating the temporary storage 124 simultaneously with the main storage 118 (as a part of the virtual storage). Then the computing system 500 is ready to restart with the substituted main storage 118.

In the Windows operating systems an interrupt request packet (IRP) is a request to the OS kernel to perform some action relating to the storage device, such as a WRITE to or a READ from the storage device. Note that IRP's sometimes go by other names (depending on the hardware and operating system involved), but, in general, perform the above function. In this discussion, IRP's directed to reading or writing data from/to the storage device are primarily at issue. Other IRP's, such as control IRP's or drive condition requests, are treated as they would be treated in normal OS operation mode. In other words, such IRP's are passed to low level drivers. Detailed description of handling of such IRPs is outside the scope of this discussion.

FIG. 3 illustrates the process of handling external IRPs in the present invention. The term "external IRP" means IRP that is initiated by OS or user application. IRPs initiated by the data transfer procedure 120 are treated with the use of real addresses.

As shown in FIG. 3, in step 302, the process first checks if the IRP is a READ IRP. If it is a READ IRP, then, in step 304 the process checks if the particular storage sub-unit is marked in the first bitmap (which indicates which blocks of the main storage 118 have been transferred to the temporary storage 124). If the answer is no, then the IRP is redirected to the main storage 118 in step 306. The process then returns back to step 302. If, in step 304, the storage sub-unit is marked in the first bitmap, then the access request is redirected to the temporary storage 124 in step 314. The process then returns to step 302.

If, in step 302, the IRP is not a READ IRP, then the process checks if the IRP is a WRITE IRP (step 308). If it is not a WRITE IRP, then, in step 316, the IRP is passed to the underlying physical drive, and the process returns to step 302. Note that the main storage, source storage, virtual storage and temporary storage can all "live" on the same physical drive, either as an entire drive, or as files or folders. Alternatively, they can be located on different storage drives. Thus, other IRPs are passed to any preassigned physical storage.

In the preferred embodiment, the term "passing" is used with respect to a layered model of data treatment, where a request during processing is transferred (passed) from one layer to another processing layer via some mechanism that depends on the operating system's and/or hardware's architecture. From this point of view, the term "passing" refers to retrieving data corresponding to a request and transferring that request to the appropriate layer, depending on the request's nature. For example, data corresponding to the request may be transferred to the storage port driver or to a network utility or directly to the port of physical storage. In their turn, the port of the physical storage can be accessed via corresponding controller, such as SCSI or IDE.

If, in step 308, the IRP is a WRITE IRP, then the process checks if the storage sub-unit is marked in the first bitmap (step 310). If it is, then the process proceeds to step 314, as described above. If it is not, then the storage sub-unit is marked in the first bitmap (step 312) and the process proceeds to step 314.

In other words, all attempts to WRITE to storage in steps 308 and 310 are redirected to the intermediate storage 124. The system 500 itself does not "know" that the storage it is accessing is virtual storage, rather than its main storage 118.

In an alternative embodiment shown in FIG. 6, WRITE IRPs are redirected to the main storage if corresponding block have not been restored from the source drive and have not been copied to the temporary storage. To implement this feature, an additional checkup procedure 320 is added that checks if the block is marked in the second bitmap.

In one embodiment of the invention, the first bitmap can only include identifiers of marked blocks, since "unmarking" of the block means removing the corresponding identifier from the bitmap. In another embodiment, all the blocks of the main storage 118 can be reflected in the bitmap using corresponding "flags" or bits.

FIG. 4 describes the process of transferring data from the source storage 116 (in this case, image storage) to the main (local) storage 118. As shown in FIG. 4, in step 402, the process checks if there is any free space on the main drive 118 for blocks that have been marked in a second bitmap (which indicates which blocks of the source storage 116 have to be transferred to the main storage 118). If the answer is yes, the data is read from the source storage 116 (step 422). Data is then written to the main storage 118 (step 424). The appropriate bits are unmarked or reset in a second bitmap (step 426). Next, the process checks if any block in the second bitmap is marked (step 412). If the answer is yes, then the process repeats from the step 402, and then proceeds to step 302, see FIG. 3.

If the answer is NO, then substitution is finished (step 414). The user applications 100 continue their execution (step 420). The process then returns to step 220, as described above (step 416).

In step 402, if there is no free space on the main storage 118 for blocks that have been marked in the second bitmap, the process then checks if there are any unmoved blocks of the main storage 118 (step 404). If the answer is NO, then there is insufficient space on the disk drive, and the process has to terminate as an "emergency" measure (step 418). The process then terminates (step 430). Steps 404, 418 and 430 are optional and may be used, e.g., if a storage area assigned for the temporary storage blocks is reduced in size during substitution. In addition, an "undo" of all the changes can be implemented (step 432). In one embodiment, the "undo" operation is performed by copying blocks of the temporary storage 124 back to corresponding blocks of the main storage 118. Note that this process may be implemented as a background process.

In another embodiment, when the temporary storage 124 is a part of the drive or the drive's partition that also contains the main storage 118, an alternative method of restoring temporary storage blocks as blocks of the main storage 118 may be used. In such an embodiment, the file structure of the main storage 118 can be updated to reflect relocation of data blocks during previous operations.

If, in step 404, the answer is yes, then the block is READ from the main drive (step 406). The block is written to temporary storage 124 (step 408). The appropriate bit in the first bitmap is marked (step 410). The process then proceeds to step 412, as described above.

Similar to the first bitmap, the second bitmap may reflect identifiers of blocks that have to be copied or "flags" for all the blocks of the source storage.

FIG. 4 reflects processes 210 and 212 that run in synchronous mode. Also, a full asynchronous mode of running the processes 210 and 212 may be realized by deletion of steps 406, 408, 410 and optionally 404. In such an implementation, a procedure of transferring data from the main storage 118 to the temporary storage 124 also can be implemented as a background process. Such a background process reads blocks from the main storage 118 that are unmarked in the first bitmap and, together with marking these blocks in the first bitmap, writes the blocks to the temporary storage 124. Also, blocks that have to be read can be marked in the second bitmap.

The present invention allows replacement in a simple manner of part or all the data from a first storage to data that is provided from a second storage. Generally, it is not critical which particular data is supplied by the source data storage. In other words, the file structure can be transferred or restored, or the physical structure of the disk can be restored (i.e., on a block-by-block basis, instead of a file-by-file basis). The set of data is defined by the second bitmap and may include file system identifiers as well.

The present invention can be used to exchange data between different hard drives, for example, when a more powerful server is brought online, with identical functions to the server being replaced. The present invention can also be used for archiving the contents of the hard disk drive, with a subsequent use of the archive in a different computer system. For such a swap, part of the source drive may be used as a part of temporary storage, wherein the intermediate storage may be used as a cache or buffer.

As yet another option, it is possible to substitute one operating system for a different one. Note that the operating system works with virtual storage through appropriate drivers, for example, by replacing standard operating system drivers with special drivers designed to insure that access requests are directed to the virtual storage. The processes of copying data between the temporary storage 124 and the virtual storage can be a background process, including direct memory access, which substantially increases the speed of the process. Since both the dedicated driver and data transfer procedure are required for data substitution, they should be resident in the server RAM, and can be deleted simply by restarting the system 500.

Furthermore the temporary storage 124 may be used as a source drive for the source storage 116. As a result, another asynchronous process may be started to transfer data from the temporary storage 124 to the source storage 116, thus realizing full swapping of the disk content.

The temporary storage 124 can be, for example, on a network drive, or on an element of a storage area network, or can be part of a local drive, or an area of a local drive specifically reserved for temporary storage. The local drive that is being backed up can be the entire drive, or a portion of the drive, or some set of sectors of the local drive. In one embodiment, the data that needs to be backed up can be presented as encoded data, encrypted data, or in the form of lossless compressed code or converted code.

The old contents of the main drive is pushed out to temporary storage 124, and the operating system, upon an access request, actually addresses the temporary storage 124. This is done in order to avoid a conflict that can be caused by the operating system trying to access data that is in the process of being copied, or the operating system trying to access a location on the local drive to which data is being copied. As an alternative, the copying of the source to the local drive can take place such that empty sectors are copied to first, and only then to sectors that contain data.

Generally, the process of migrating the data is performed in the background.

The present method provides for partial or complete replacement of data in the main storage 118 with data from the source storage 116. Generally, the data structure of the source storage 116 is not critical. The method described herein is particularly suited to the swapping of data between hard drives, for example, when a less powerful server is replaced by a more powerful one, while its functions remain the same.

Figure 5:
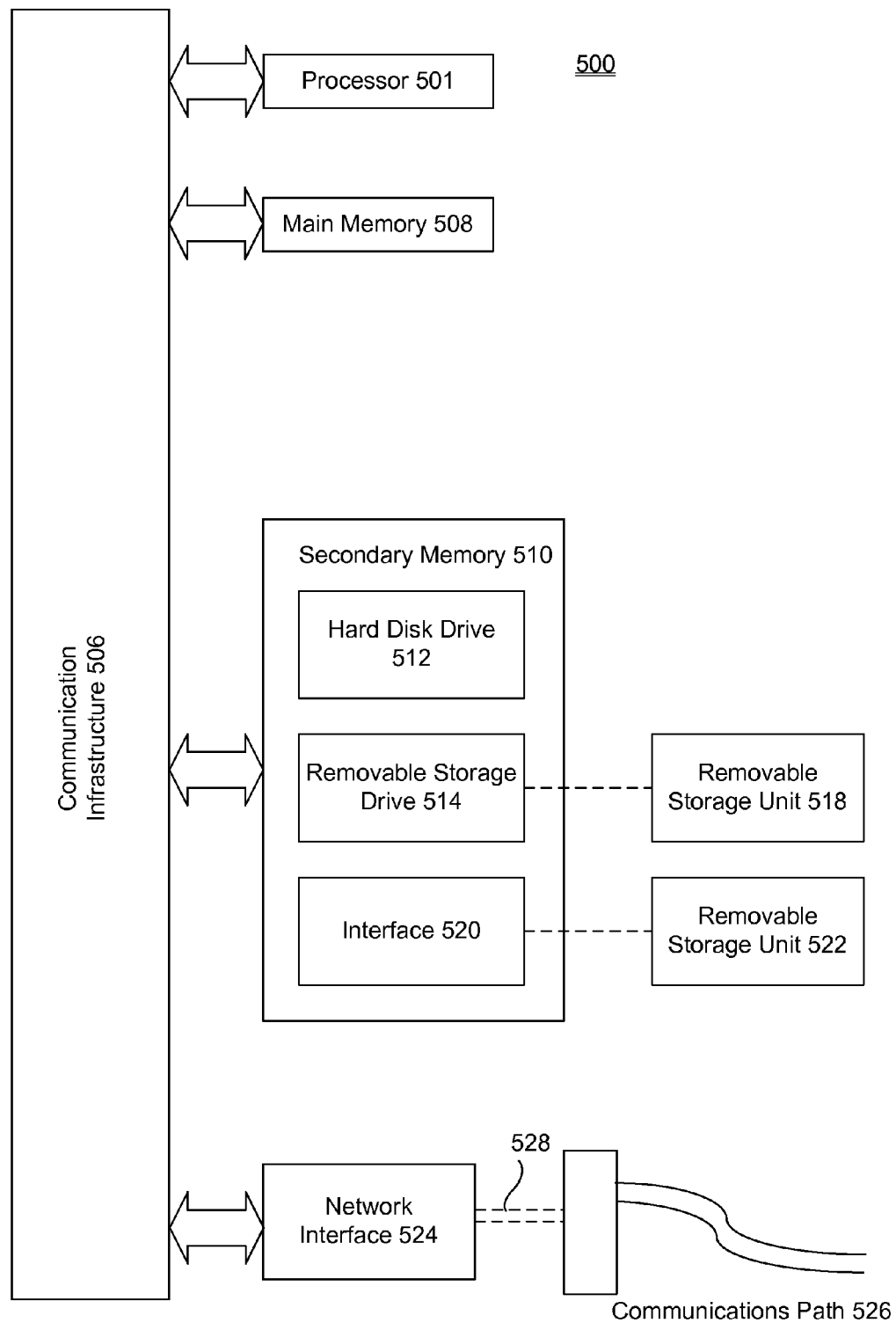
FIG. 5 illustrates an example of a computing system that may be used in the invention.

An example of the computing system 500 is illustrated in FIG. 5. The computing system 500 includes one or more processors, such as processor 501. The processor 501 is connected to a communication infrastructure 506, such as a bus or network. Various software implementations are described in terms of this exemplary computer system. After reading this description, it will become apparent to a person skilled in the relevant art how to implement the invention using other computer systems and/or computer architectures.

Computing system 500 also includes a main memory 508, preferably random access memory (RAM), and may also include a secondary memory 510. The secondary memory 510 may include, for example, a hard disk drive 512 and/or a removable storage drive 514, representing a magnetic tape drive, an optical disk drive, etc. The removable storage drive 514 reads from and/or writes to a removable storage unit 518 in a well known manner. Removable storage unit 518 represents a magnetic tape, optical disk, or other storage medium that is READ by and written to by removable storage drive 514. As will be appreciated, the removable storage unit 518 can include a computer usable storage medium having stored therein computer software and/or data.

In alternative implementations, secondary memory 510 may include other means for allowing computer programs or other instructions to be loaded into computing system 500. Such means may include, for example, a removable storage unit 522 and an interface 520. An example of such means may include a removable memory chip (such as an EPROM, or PROM) and associated socket, or other removable storage units 522 and interfaces 520 which allow software and data to be transferred from the removable storage unit 522 to computing system 500.

Computing system 500 may also include one or more communications interfaces, such as communications interface 524. Communications interface 524 allows software and data to be transferred between computing system 500 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, an RF link and other communications channels. In an embodiment of the invention, signals 528 comprise data packets sent to processor 501. Information representing processed packets can also be sent in the form of signals 528 from processor 501 through communications path 526.

The terms "computer program medium" and "computer usable medium" are used to generally refer to media such as removable storage units 518 and 522, a hard disk installed in hard disk drive 512, and signals 528, which provide software to the computing system 500.

Computer programs are stored in main memory 508 and/or secondary memory 510. Computer programs may also be received via communications interface 524. Such computer programs, when executed, enable the computing system 500 to implement the present invention as discussed herein. In particular, the computer programs, when executed, enable the processor 501 to implement the present invention. Where the invention is implemented using software, the software may be stored in a computer program product and loaded into computing system 500 using removable storage drive 514, hard drive 512 or communications interface 524.

Figure 7:
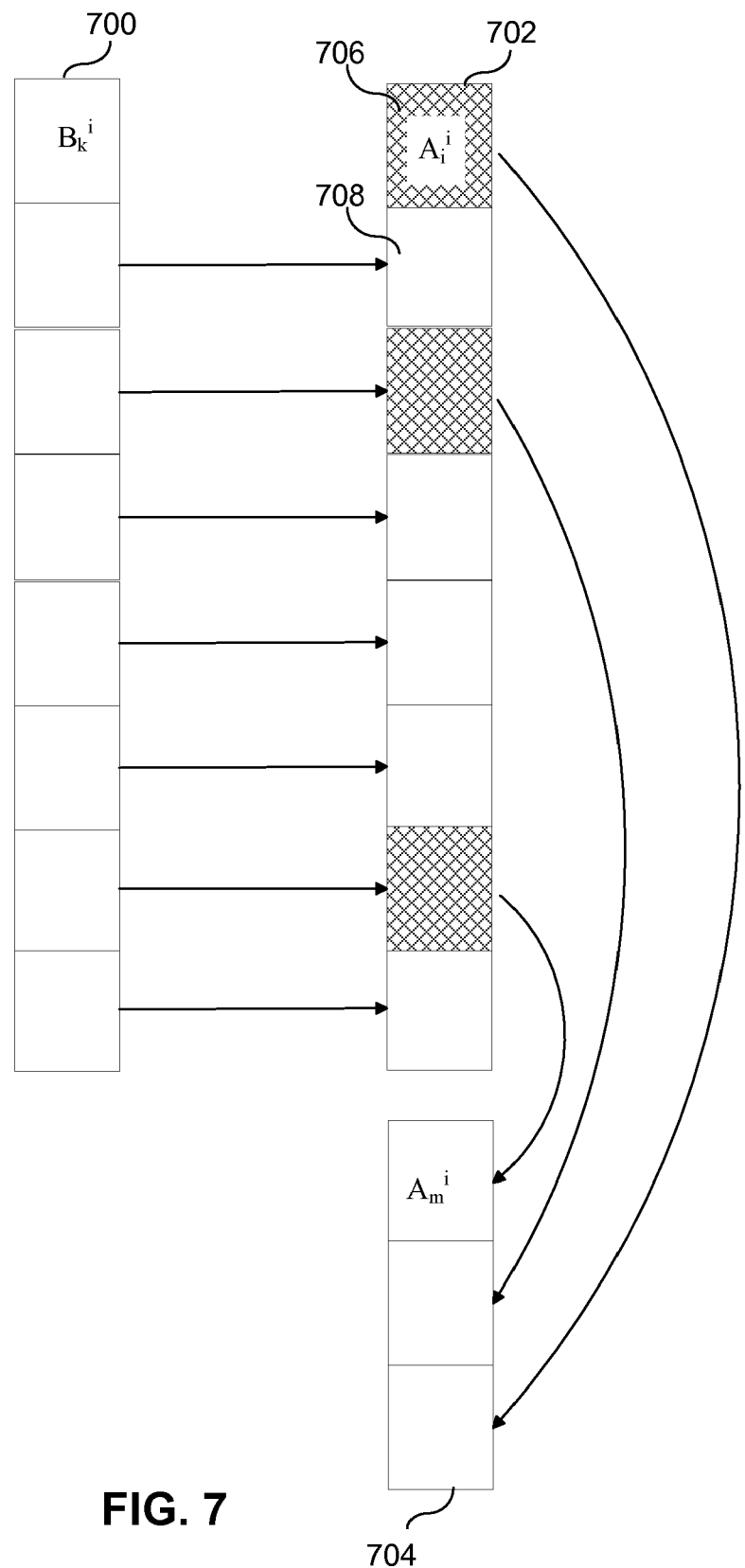
FIG. 7 illustrates an example of usage the blocks during one step of a substitution procedure.
Figure 8:
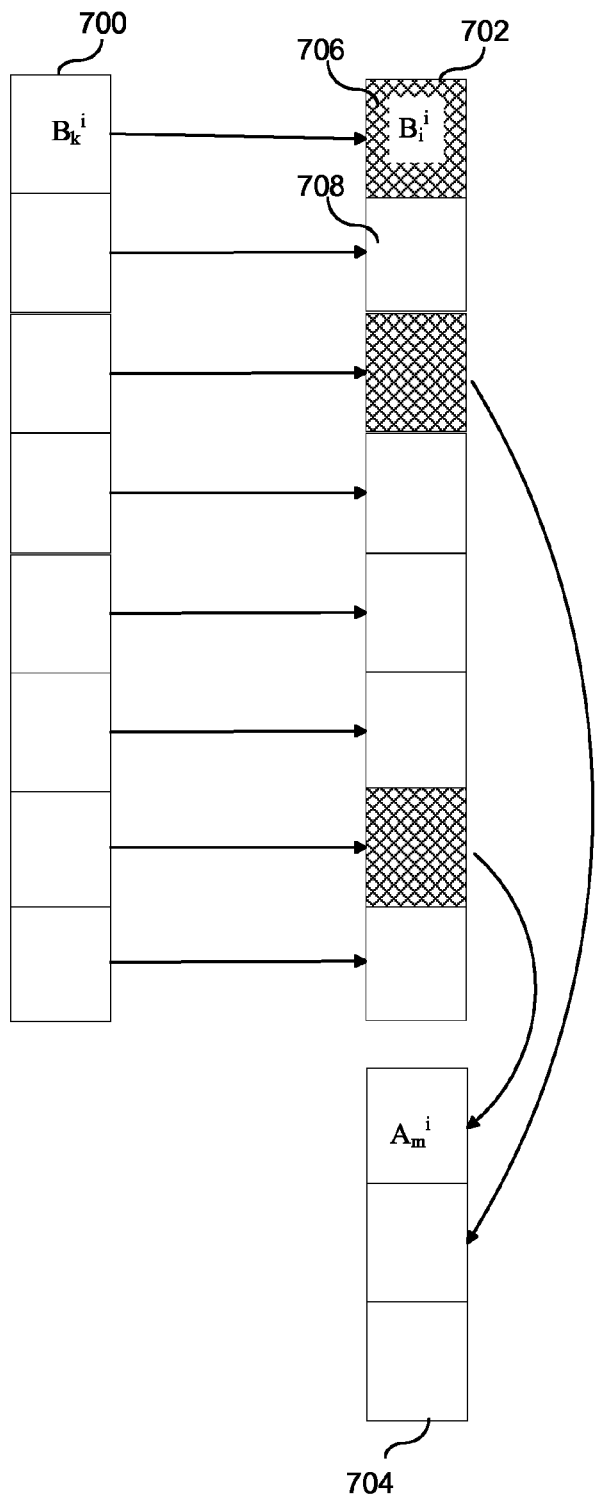
FIG. 8 illustrates an example of usage the blocks during the next step of the substitution procedure.

FIGS. 7 and 8 show memory handling in the present invention. As shown in FIGS. 7 and 8, disk content being restored is stored in separate area (source storage) 700, e.g., in form of file or the like or another disk or disk partition.

Disk storage of the computing system 500, meant to be reconfigured, includes a storage area 702 that corresponds to the source storage area 700. In dependence on the algorithm of treatment of blocks in the present invention the main storage area may comprise used blocks 706 or used blocks 706 and free blocks 708. When free blocks 708 are initially hidden from the OS, copying data from the source storage to the corresponding free blocks 708 may be implemented as a background process and such a procedure generally does not interfere with running processes.

When free blocks need to be accessed by user or OS applications, the main storage 118 can contain all (free and used) blocks corresponding to the blocks of the source storage area 700.

Initially source storage area 700 contains block $B_k^i$, where i is a destination address of the corresponding block in the main storage 118 and k is a physical address or another identifier of the block in the source storage area 700. The main storage 118 contains block $A_i^i$, where i is an address of the block in the virtual storage and in the main storage.

For restoring block $B_k^i$ from the source storage to the main storage 118, location of the storage area 700 that contains block $A_i^i$ should be cleared To provide this, block $A_i^i$ (see FIG. 7) is moved to a location of the temporary storage area, that has an address m (see FIG. 7). After this, block $A_m^i$ is formed, where i indicates that the contents of the block corresponds to address i of the main storage 118. As the area with address i becomes identified, the block $B_k^i$ is moved to an area with address i (see FIG. 8) and block $B_i^i$ is formed. From this moment on, the block with real address i is hidden from the operating system.

Having thus described an embodiment of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of changing storage drive contents, comprising:
    installing a redirection driver in a computer system, wherein the redirection driver redirects requests to a main storage of the computer system to one of the main storage and a temporary storage;
    copying files from the main storage to the temporary storage;
    replacing files in the main storage with files in a source storage; and
    redirecting, to the temporary storage, requests directed to files of the main storage that have been copied to the temporary storage,
    wherein the main storage and the temporary storage share partitions of the same physical storage drive,
    wherein free blocks of the physical storage drive are used as blocks of the temporary storage, and
    wherein blocks are assigned to the temporary storage on demand.

2. The method of claim 1, wherein copying the files from the main storage to the temporary storage is a background process.

3. The method of claim 1, wherein restoring the files from the source storage into files of the main storage is a background process.

4. The method of claim 1, further comprising hiding the temporary storage from an operating system of the computer system.

5. The method of claim 1, wherein the temporary storage is implemented as any of a RAM, a DVD-RAM, and a hard disk drive.

6. The method of claim 1, further comprising booting another operating system to replace an operating system of the computer system, after finishing substituting storage drive content.

7. The method of claim 1, further comprising storing, in the source storage, an earlier state of the main storage.

8. A method of changing storage drive contents, comprising:
    installing a redirection driver in a computer system, wherein the redirection driver redirects requests to a main storage of the computer system to one of the main storage and a temporary storage;
    copying files from the main storage to the temporary storage;
    replacing files in the main storage with files in a source storage;
    redirecting, to the temporary storage, requests directed to files of the main storage that have been copied to the temporary storage; and
    copying blocks of the temporary storage back to corresponding blocks of the main storage if there are no free blocks available in the main storage,
    wherein the main storage and the temporary storage share partitions of the same physical storage drive, and
    wherein free blocks of the physical storage drive are used as blocks of the temporary storage.

9. A method of changing storage drive contents, comprising:
    installing a redirection driver in a computer system, wherein the redirection driver redirects requests to a main storage of the computer system to one of the main storage and a temporary storage;
    copying files from the main storage to the temporary storage;
    replacing files in the main storage with files in a source storage;
    redirecting, to the temporary storage, requests directed to files of the main storage that have been copied to the temporary storage; and
    using blocks of different drives as blocks of the temporary storage if the storage drive contains an insufficient number of free blocks,
    wherein the main storage and the temporary storage share partitions of the same physical storage drive.

10. A method of changing storage drive contents, comprising:
    installing a redirection driver in a computer system, wherein the redirection driver redirects requests to a main storage of the computer system to one of the main storage and a temporary storage;
    copying files from the main storage to the temporary storage;
    replacing files in the main storage with files in a source storage;
    redirecting, to the temporary storage, requests directed to files of the main storage that have been copied to the temporary storage;
    wherein the storage drive includes a virtual storage represents at least a partition of the disk drive, and
    wherein blocks of the temporary storage are hidden on a top level of an operating system of the computer system.

11. A method of changing storage drive contents, comprising:
    installing a redirection driver in a computer system, wherein the redirection driver redirects requests to a main storage of the computer system to one of the main storage and a temporary storage;
    copying files from the main storage to the temporary storage;
    replacing files in the main storage with files in a source storage;
    redirecting, to the temporary storage, requests directed to files of the main storage that have been copied to the temporary storage; and
    dividing a physical storage drive into the main storage, the temporary storage and a residual storage area;
    wherein blocks of the residual storage area are available for the access requests.

12. A computer program product comprising a non-transitory computer useable medium having computer program logic recorded thereon for implementing the method of claim 1.

13. A system for changing storage drive contents comprising:
    a computer system having a main storage, a temporary storage, and a source storage;
    a redirection driver installed into an operating system of a computer, wherein the redirection driver redirects requests to a main storage to one of the main storage and a temporary storage; and
    a background process that copies files from the main storage to the temporary storage and that overwrites corresponding files in the main storage with files from a source storage, wherein the requests to files of the main storage that have been copied to the temporary storage are redirected to the temporary storage, wherein the storage drive includes a virtual storage represents at least a partition of the disk drive, and wherein blocks of the temporary storage are hidden on a top level of an operating system of the computer system.

14. The system of claim 13, wherein the main storage and the temporary storage share partitions of the same physical storage drive.

15. The system of claim 13, wherein free blocks of the physical storage drive are used as blocks of the temporary storage.

16. The system of claim 15, wherein blocks are assigned to the temporary storage in succession.

* * * * *